F. S. SHORT.
REVERSIBLE DRIVING CHUCK.
APPLICATION FILED MAY 19, 1916.
1,211,633.
Patented Jan. 9, 1917.
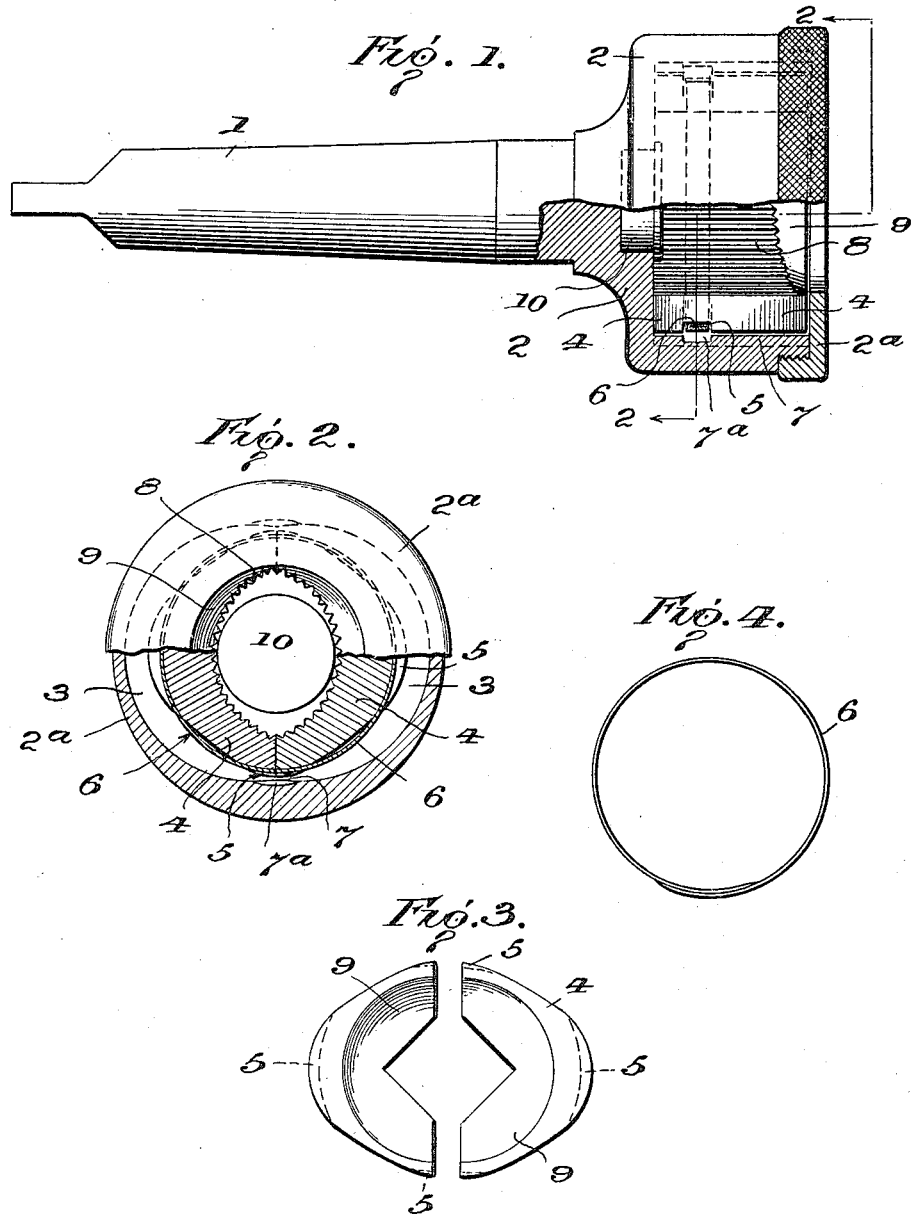
Inventor
Frederick S. Short,
By Clark, Prentiss & Clark,
Attorneys

UNITED STATES PATENT OFFICE.

FREDERICK S. SHORT, OF SPRINGFIELD, MISSOURI.

REVERSIBLE DRIVING-CHUCK.

1,211,633. Specification of Letters Patent. Patented Jan. 9, 1917.

Application filed May 19, 1916. Serial No. 98,491.

*To all whom it may concern:*

Be it known that I, FREDERICK S. SHORT, a citizen of the United States, residing at Springfield, in the county of Greene and State of Missouri, have invented new and useful Improvements in Reversible Driving-Chucks, of which the following is a specification.

This invention relates to chucks in general and has to do particularly with chucks for holding or gripping the shanks of drills, taps, reamers or any other tools requiring holding means to properly secure them while performing work.

One object of the invention is to provide a chuck of central construction and so designed that it may be used for either right or left hand drive.

Another object is to permit engagement of the operative parts without the preliminary tightening or adjusting of a movable part as is necessary in the chucks of commerce.

Another object is to permit the chuck to quickly release the tool by slight reverse turn of direction on the part of the chuck and without the adjustment of any tightening or loosening member on the part of the operator.

The invention consists of the novel construction and arrangement of parts and will be more fully described and set forth in the following specification and claims and illustrated in the accompanying drawing in which:—

Figure 1 represents a side elevation of the chuck partly in section to show the construction of the parts of the chuck body. Fig. 2 represents an end view of the chuck member taken along the line 2—2 of Fig. 1. Fig. 3 is a view of the jaw members having square jaws instead of the pipe jaws as shown in Fig. 2. Fig. 4 represents the expansible spring member for embracing the jaw members within the chuck.

Referring in detail to Fig. 1, the shank of the chuck member is designated by the numeral 1. This shank member has at one end the chuck body 2 having a central chamber to inclose the working parts of the chuck. These parts may be suitably retained within the central chamber by cap 2ª of the usual construction. This cap has a central opening for centering the tool member to be held in the chuck. The central space or chamber within the body member 2 is provided with the eccentric recesses 3 on either side of the chuck. The jaw members 4 are formed elliptically to correspond with the recesses 3, the elliptic projections of the jaw members normally lying opposite the recesses 3 when the clutch is not tightened on a tool or other member held between the jaws. The jaw members 4 are provided on their periphery with a groove 5 adapted to receive a spring member 6 which embraces the jaws and normally holds them together. The wall of the member 2 is provided on its inner side with a plurality of double cam surfaces 7 extending the depth of the central chamber and parallel to the axis of the chuck. These surfaces are spaced between the recesses 3 and are provided with a gradual slant from the depth of the recess 3 to the crest of the cam surface 7 on either side of the cam surface. An annular groove 7ª is provided on the inner side of the supporting wall 2 and passes through the surface of the cam member 7 at a point opposite the spring 6 carried by the jaw members. The jaw members have a gripping surface 8 which may be either a number of corrugations for gripping articles with curved surfaces such as round shanks of bolts or drills or the gripping surface may be angular as indicated in Fig. 3 for gripping members having rectangular or square shanks. The outer end of the jaw members is provided with a cupped and outwardly flaring surface 9 for directing the entrance of the tool to be held into the space between the jaws. The body member 2 has at the inner end of the chamber a centering block 10 rigidly fixed with respect to the axis of the chuck. This member 10 has an outer portion which extends between the jaw members 4 to space these members centrally within the chuck body.

The operation of the chuck will be understood to depend upon the co-action between the cam surfaces 7 of the clutch body 2 and the ellipse cam surfaces of the jaw members 4. It will be understood that when the jaw members 4 engage the object to be clutched such as a round or a square part, presuming that this part is held against rotation, the jaw members 4 will remain stationary with the driven object until the body member 2 rotated by the shank 1 engages the elliptic cam surfaces 5 of the jaw members 4. As the cams 7 present their surfaces on the cams 5 of the jaws 4 the latter are forced against the driven object and rotate the chuck with it. The cam action thus set up increases the grip on the object held within the jaws in direct ratio to the torque set up by the driving means. To release the driven object it is necessary only to reverse the motion of the chuck body and the cams 5 and 7 will automatically separate and release the jaws. If revolved in the opposite direction it will be understood that the cams 5 of the jaw members 4 will engage the opposite side of the double cams 7 and will drive the object clutched within the jaws in the opposite direction, the reversing movement of the clutch body releasing the object as previously described. The spring 6 is protected during the co-action between the cam parts by the grooves around the jaw members and through the stationary cams 7. It will be understood that a hollow threaded cupped portion may be substituted for the shank member 1 as is the practice in machine shops.

Changes and modifications in size, relative shape and material as well as the relative number of cams and recesses may be made without departing from the scope of the invention.

What I claim is—

1. An automatic chuck comprising a shank and chuck body rigidly connected, said chuck body providing a supporting wall having a central chamber, a double cam surface within said chamber and rigid with respect to said supporting wall, and jaw members within said chamber arranged to coact with said cam surface when the latter is rotated with respect to said jaw members, said jaw members having a normal closing action whereby any article engaged thereby tends to hold the jaws stationary until movement of the shank and chuck body causes said cams to engage with said jaw members.

2. An automatic chuck comprising a shank and chuck body rigidly connected, said chuck body providing a supporting wall having a central chamber, double cam surfaces within said chamber and rigid with respect to said supporting wall, jaw members within said chamber arranged to coact with said cam surfaces when the latter are rotated with respect to said jaw members, and yieldable resilient means engaging said jaw members and holding the same in a normally closed position whereby any article engaged thereby tends to hold the jaws stationary until movement of the shank and chuck body causes the said cams to engage with said jaw members.

3. A chuck comprising a chuck body providing a supporting wall having a central chamber, a double cam surface within said chamber and rigid with respect to said supporting wall, jaw members within said chamber arranged to co-act with said cam surface when rotated in either direction with respect to said supporting wall, an annularly extending groove on the periphery of the said jaw members, and a substantially circular spring member seated in said groove and embracing said jaw members to normally hold said members together.

4. A chuck comprising a chuck body providing a supporting wall having a central chamber, a plurality of double cam surfaces within said chamber and rigid with respect to said supporting wall, said cam surfaces providing eccentric recesses within said chamber between said surfaces, a plurality of jaw members within said chamber having eccentrically formed extensions corresponding to said eccentric recesses, an annularly extending groove on the periphery of said jaw members, and a substantially circular spring member seated in said groove and embracing said jaw members to normally hold said members together, said jaws engaging with said cam surfaces upon rotary movement in either direction of said jaws with respect to said supporting wall.

5. A chuck comprising a chuck body providing a supporting wall having a central chamber, a double cam surface within said chamber and rigid with respect to said supporting wall, jaw members within said chamber arranged to co-act with said cam surface when rotated in either direction with respect to said supporting wall, an annularly extending groove on the periphery of said jaw members, and a substantially circular spring member seated in said groove and embracing the jaw members to normally hold said members together, said supporting wall within said chamber having an annularly extending groove providing a groove on the surface of said cam member to receive said spring when said jaw members engage said double cam surface.

6. A chuck comprising a chuck body providing a supporting wall having a central chamber, a plurality of double cam surfaces within said chamber and rigid with respect to said supporting wall, said cam surfaces providing eccentric recesses within said chamber between said surfaces, a plurality of jaw members within said chamber having eccentrically formed extensions corresponding to said eccentric recesses, an annularly extending groove on the periphery of said jaw members, and a substantially circular spring member seated in said groove and embracing said jaw members to normally hold said members together, said supporting wall within said chamber having an annularly extending groove providing a groove on the surface of said cam member to receive said spring when said jaw members engage said double cam surfaces, upon rotary movement of said jaws with respect to said supporting wall.

7. In a chuck, a body member having a central chamber, a plurality of jaw members within said chamber, and an expansible spring embracing said jaw members to hold the same together in a normally closed position.

8. In a chuck, a body member having a central chamber, a plurality of jaw members within said chamber, and an expansible spring embracing said jaw members to hold the same together, said jaw members having a gripping surface parallel to the axis of the chuck and a beveled receiving face flaring outwardly from said gripping surface.

9. In a chuck, a body member having a central chamber, a plurality of jaw members within said chamber, an expansible spring embracing said jaw members to hold the same together, and a central centering member for said jaws having a diameter of approximately the same length as the distance between said jaws when in the closed position.

10. In a chuck, a chuck body providing a supporting wall having a central chamber, and a chuck jaw member in said chamber having an eccentrically extending cam on one side and a gripping surface on the other side opposite thereto, the perpendicular distance from the axial center of said chuck to the crest of the cam surface being greater than to any other point on the cam surface.

In testimony whereof I affix my signature in presence of two witnesses.

FREDERICK S. SHORT.

Witnesses:
  Geo. Godsy,
  H. C. Stubblefield.

Copies of this patent may be obtained for five cents each, by addressing the "Commissioner of Patents, Washington, D. C."